C. THEUNE.
INDICATOR FOR DETERMINING AND RECORDING THE CURRENT VELOCITIES AND THE CROSS SECTIONS OF RIVERS AND THE LIKE.
APPLICATION FILED NOV. 25, 1912.
1,103,099.
Patented July 14, 1914.
2 SHEETS—SHEET 1.
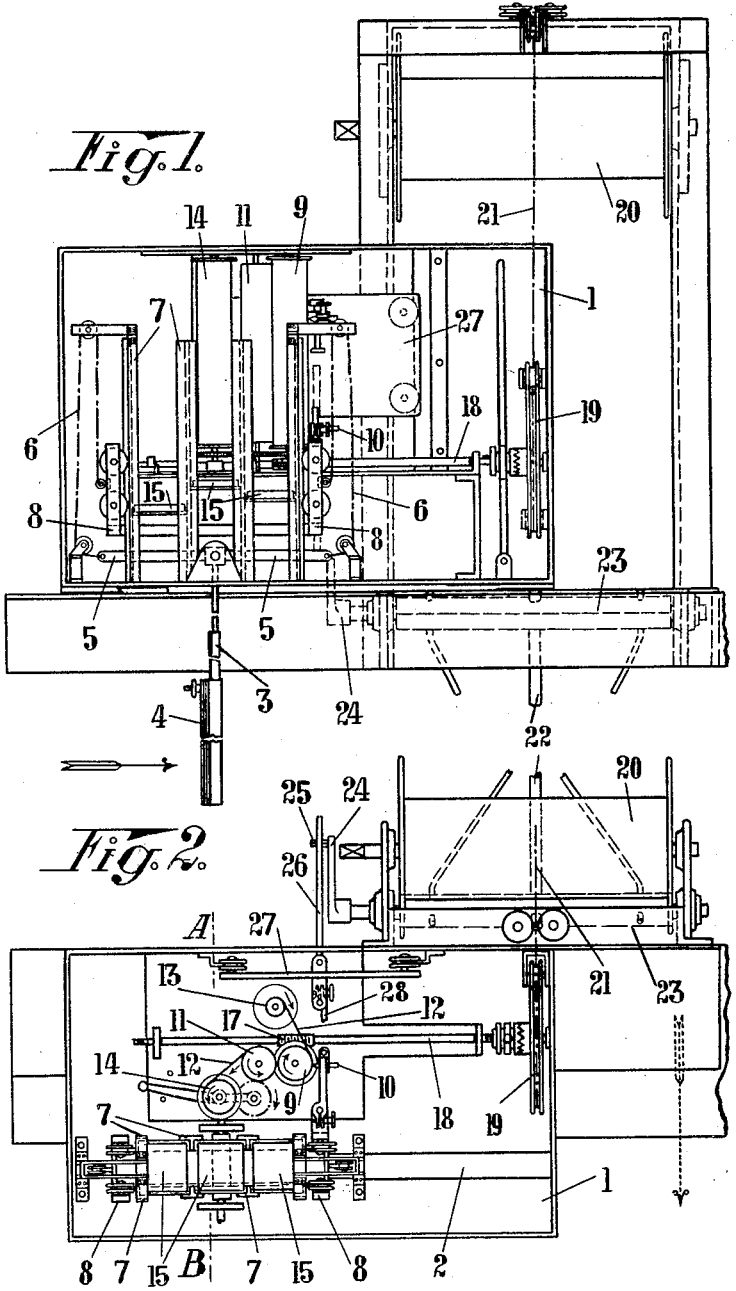
WITNESSES:
INVENTOR:
Charles Theune
BY
Edgar Tate & Co.
ATTORNEYS.

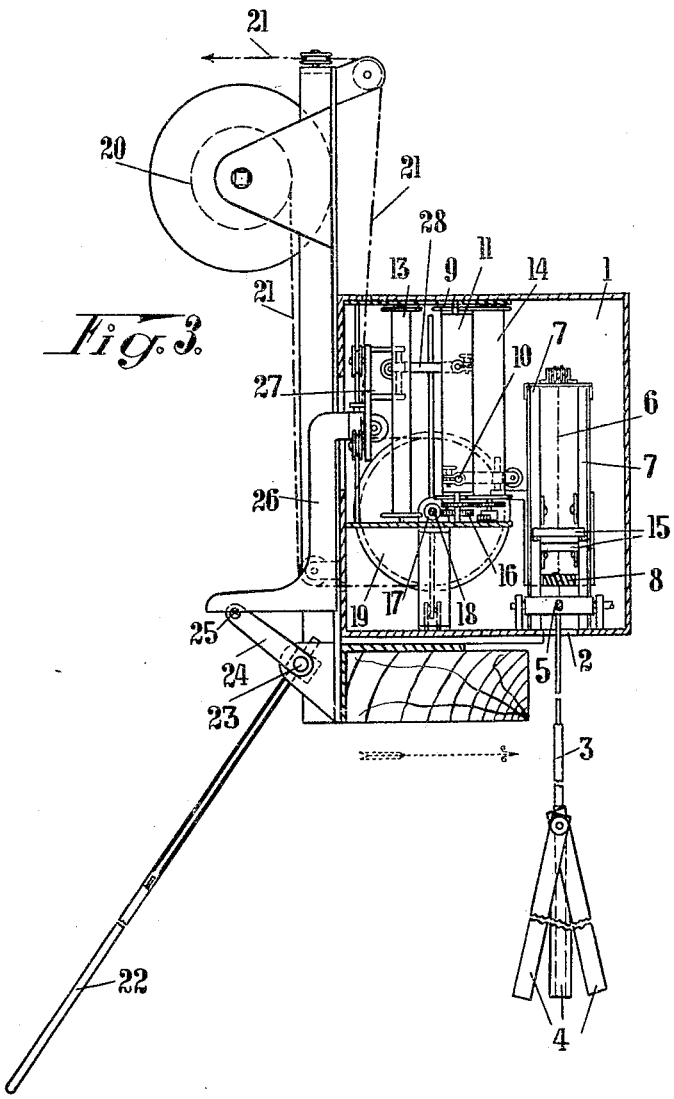

UNITED STATES PATENT OFFICE.

CHARLES THEUNE, OF BERLIN, GERMANY.

INDICATOR FOR DETERMINING AND RECORDING THE CURRENT VELOCITIES AND THE CROSS-SECTIONS OF RIVERS AND THE LIKE.

1,103,099.  Specification of Letters Patent.  Patented July 14, 1914.

Application filed November 25, 1912. Serial No. 733,259.

*To all whom it may concern:*

Be it known that I, CHARLES THEUNE, a subject of the German Emperor, residing at 33 Wurttembergischestrasse, Berlin, Germany, have invented certain new and useful improvements in indicators for determining and recording the current velocities and the cross-sections of rivers and the like, of which the following is a specification.

The invention relates to an indicator for measuring and recording the current velocities and the cross-sections of rivers and the like, in which a pendulum rod that hangs down from a casing and has a pressure surface at the lower end is arranged and a recording device is moved in front of a recording cylinder correspondingly to the unevenness of the bottom by means of a feeler that slides on the bottom of the river.

The invention consists in the arrangement at the point of suspension of the pendulum rod of arms extending on opposite sides, which are connected by means of a traction device or the like with a carriage that is vertically movable between upright guides and carries a recording device that acts on the recording cylinder.

If when there is a flow of water the pendulum rod moves, the carriage indicates through the recording device the extent of the movements whereby the current velocity can be determined, on a strip of paper conveyed over the recording cylinder, which at the same time receives an impression of the outline of the river-bed that is indicated through the feeler. The recording cylinder on the other hand is connected with a measuring wheel, around which a measuring line that can be wound off a winding cylinder is carried in such a manner that after the free end of the measuring line has been fixed on the bank the line is run off the winding cylinder from the point where it is attached to the opposite bank and sets the measuring wheel together with the recording cylinder in motion. As hereby the impulsion of the recording cylinder is effected in accordance with the rate of the movement from one bank to the other, the exact width of the river can be ascertained from the length of the strip of paper unwound, by which again in combination with the records of the movements of the pendulum rod and of the outline, the current velocity at any spot between the bank on the one hand, and the exact cross section of the river on the other hand is determined.

One example of the invention is illustrated in the drawing.

Figure 1 represents the apparatus for determining and recording the current velocity and the cross-sections of rivers in side elevation open to view. Fig. 2 is a plan, while Fig. 3 is a transverse section through the line A—B in Fig. 2.

In the casing 1 is pivotally mounted a telescopic pendulum rod 3 that runs down through an opening 2 in the bottom, and is provided on the lower end with a pressure surface which consists of plates 4 arranged to be spread after the manner of a fan. On its upper end the pendulum rod 3 carries arms 5 running in opposite directions rectangularly to the axis of rotation, and adjustable in regard to their length, their free ends being connected, by means of ropes 6 or the like that run over pulleys, with a carriage 8 which can be raised and lowered between upright guides 7, and on which a recording device 10 that presses against a recording cylinder 9 is adjustably fixed.

If when immersed in the river or the like, the pendulum rod is moved in accordance with the stream more or less to the one side or the other in consequence of the bodies of flowing water coming against the pressing surface, the carriage 8 with the recording device 10 is raised and caused to act on a strip of paper 12 (Fig. 2) that runs over the recording cylinder 9 and a guide-cylinder 11. This strip of paper is marked with a scale and runs off a cylinder 13 on to a cylinder 14. From the record made the rate of current can be seen.

The fan-like separable plates 4 enable the extent of the pressure surface to be adjusted while by adjusting the arms 5 in regard to their length the raising of the carriage 8 with the recording device 10 can be regulated.

Between the guides 7 which can be rigidly connected with one another in any desired manner, weights 15 are seated at different heights above the carriage 8 and which can be raised and lowered. Each of the weights lies in the path of said carriage and rests on two supports arranged between the guides 7 at the sides of the path of the carriage 8, as shown in Fig. 3, so that when the carriage 8 rises, the weights 15 are successively raised from their supports so that the weights are imposed on the carriage to increasingly load the same and thereby not only reduce the ascent of the latter, but also the movement of the pendulum rod, so that, on the one hand the height of the apparatus may be correspondingly less, and on the other hand the pressure surface more fully utilized, even while the pendulum is moved out to the greatest extent. At the same time, the rising weight gives a measure of the rate of current. In order however to insure the continuous movement of the strip of paper 12, the cylinders 9, 11 and 14 are geared together at their lower ends by toothed wheels, in addition to which a worm-wheel 16 and a worm 17 act on the recording cylinder 9. The worm 17 is placed on a shaft 18, which carries at one end an engaging and disengaging measuring wheel 19, around which a measuring line 21 that is wound off a winding cylinder 20 is carried, the free end of the line extending out of the casing. Now as when the rate of the current is ascertained the measuring line 21 is fixed with the free end on the bank and the apparatus with the pendulum rod 3 which is subjected to the action of the current (for example in the direction indicated by the arrow in Fig. 1) is moved by means of a vessel (in the direction of the dotted arrow Figs. 2 and 3) rectangularly to the line of flow from the point of attachment toward the opposite bank, the measuring line 21 is wound off the winding cylinder 20, according to the speed of the vessel, and the measuring wheel 19 is actuated, which actuates the recording cylinder 9 as well as the cylinders 11 and 14 with the strip of paper 12. From the length of the strip of paper 12 that is unwound the width of the river can thus be determined, and from the record the rate of current at any point between the two banks be ascertained.

After being used the pendulum rod 3 is telescopically shortened, and put into the casing through the opening 2 in the bottom.

With the current meter a device of a known kind for indicating the outline of the bed of the river is combined, which consists of a suspended feeler 22 which as the movement is effected from one bank to the other slides along the bottom of the river, and the carrying roller 23 of which is furnished with an arm 24. On its free end the latter carries a pin 25, on which a Z-shape lifting lever 26 loosely rests, which with its other arm takes hold of a slide or carriage 27 that is vertically movable, from which an arm 28 provided with a recording device extends to the recording cylinder 9.

The feeler 22 which can yield to any unevenness of the bottom, sets the carriage 27 with the recording device 28 in action, whereby, in addition to the current rate curve the outline of the river bed is recorded by a second curve that stands in proper relation to the rate of current curve.

As however the length of the strip of paper 12 that is unwound indicates the width of the river, the exact cross-section of the river is ascertained together with the outline of the bed.

Having now particularly described and ascertained the nature of my said invention, and in what manner the same is to be performed, I declare that what I claim is:—

1. An indicator of the character set forth comprising a casing, a pendulum rod hanging down out of the casing, and formed on the lower end with a pressure surface consisting of fan-like collapsible plates so that the size of the same can be regulated, oppositely extending transverse arms on the upper end of the pendulum, a carriage, upright guides between which the carriage is movable, ropes connecting the carriage with the transverse arms on the pendulum so that through the movements of the pendulum rod, which are effected on the one side or the other according to the current, the carriage is adjusted, a recording device on the carriage and a recording cylinder, with paper strip upon which a record is made by the recording device.

2. An indicator of the character set forth comprising a casing, a pendulum rod hanging down out of the casing, and formed on the lower end with a pressure surface, oppositely extending transverse arms on the upper end of the pendulum, a carriage, upright guides between which the carriage is movable, ropes connecting the carriage with the transverse arms on the pendulum so that through the movements of the pendulum rod, which are effected on the one side or the other according to the current, the carriage is adjusted, weights 15 arranged above the carriage and between the guides so that when the carriage moves upward the weights come automatically on to or off the latter, a recording device on the carriage, and a recording cylinder, with paper strip upon which a record is made by the recording device.

3. An indicator of the character set forth comprising a casing, a pendulum rod suspended from said casing and provided at its lower end with a pressure surface, oppositely extending transverse arms on the upper end of the pendulum, a carriage, upright guides between which said carriage is movable, ropes connecting the carriage with the said transverse arms on the pendulum whereby, through the movements of the pendulum rod, which are effected on one side or the other, according to the current, the carriage is adjusted, a recording device on the carriage and a recording cylinder having a flexible strip upon which a record is made by the movement of the recording device.

4. An indicator of the character set forth comprising a casing, a pendulum rod suspended from said casing and provided at its lower end with a pressure surface, oppositely extending transverse arms on the upper end of the pendulum, a carriage, upright guides between which said carriage is movable, ropes connecting the carriage with the said transverse arms on the pendulum whereby, through the movements of the pendulum rod, which are effected on one side or the other, according to the current, the carriage is adjusted, a recording device on the carriage and a recording cylinder having a paper strip upon which a record is made by the movement of the recording device, and a depending rod or feeler whereby the outline of a river bed may be recorded on the recording cylinder by a recorder which is connected with, or operated by said feeler.

5. An indicator of the character set forth comprising a casing, a pendulum rod suspended from said casing and provided at its lower end with a pressure surface, oppositely extending transverse arms on the upper end of the pendulum, a carriage, upright guides between which said carriage is movable, ropes connecting the carriage with the said transverse arms on the pendulum whereby, through the movements of the pendulum rod, which are effected on one side or the other, according to the current, the carriage is adjusted, a recording device on the carriage, and a recording cylinder having a paper strip upon which a record is made by the movement of the recording device, a measuring wheel connected with the recording cylinder, and a measuring line cylinder a measuring line wound thereon and adapted to be wound off said cylinder and onto the recording wheel so as to determine the width of a river or the like.

6. An indicator of the character set forth comprising a casing, a pendulum having a telescopic rod adapted to be shortened and put into the casing in its contracted state, the lower end of said pendulum being provided with a pressure surface, oppositely extending transverse arms on the upper end of the pendulum, a carriage, upright guides between which the carriage is movable, ropes connecting the carriage with the transverse arms on the pendulum whereby, through the movements of the pendulum rod, which are effected on one side or the other, according to the current, the carriage is adjusted, a recording device on the carriage, and a recording cylinder having a paper strip upon which a record is made by the movement of the recording device.

7. In an indicator of the character set forth, a casing, a pendulum rod suspended from said casing the lower end of which is provided with a pressure surface, oppositely extending transverse arms connected with said pendulum, a depending rod or feeler connected with said casing, a carriage movable between upright guides, ropes connecting the carriage with said transverse arms, recording devices on said carriage and in communication with said rod or feeler, and a recording cylinder having a paper strip on which a record is made by the movement of said recording devices.

In testimony whereof I have affixed my signature, in presence of two witnesses.

CHARLES THEUNE.

Witnesses:
  AUGUST VON EGIDY,
  CRAWFORD LIKEFORD.